No. 741,643. Patented October 20, 1903.

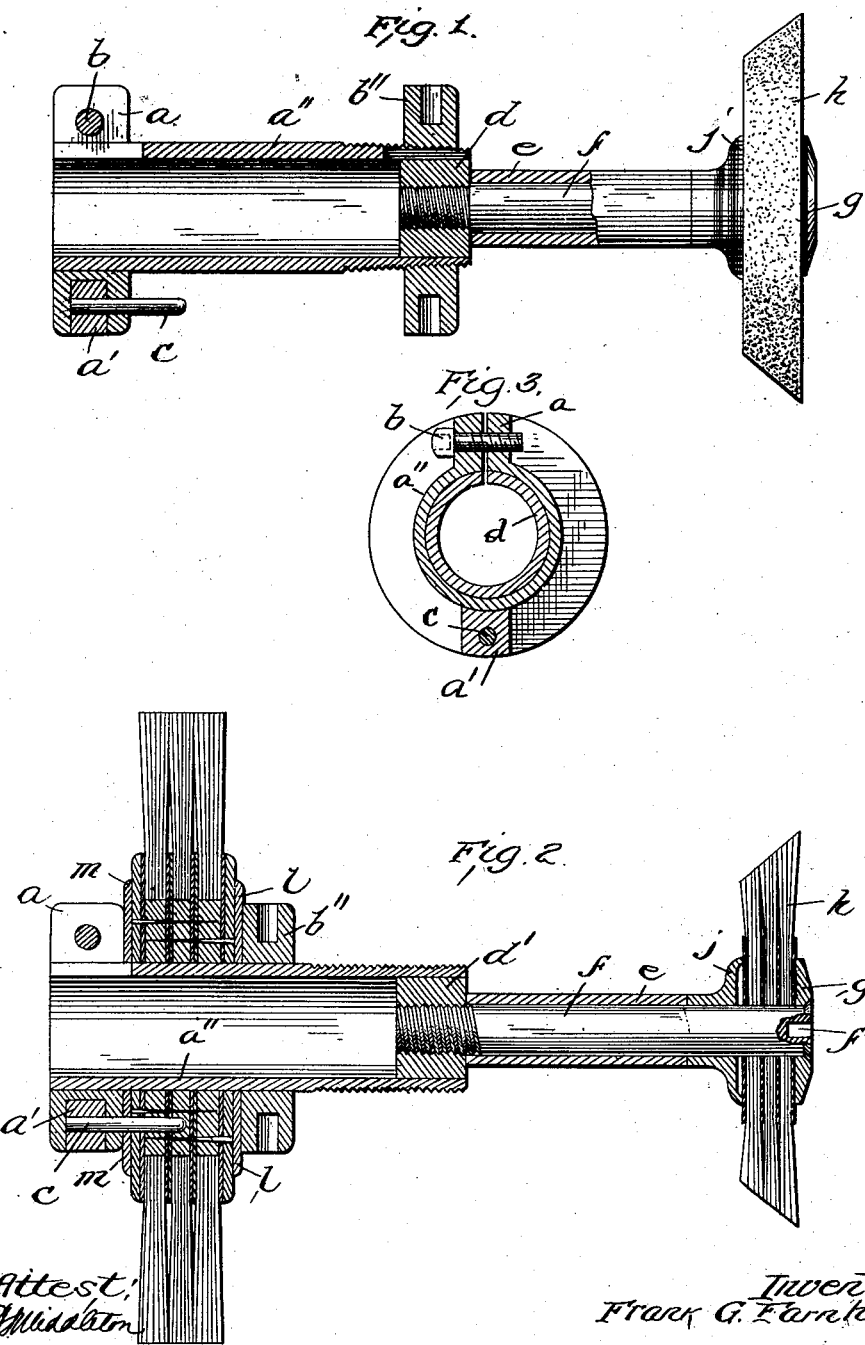

UNITED STATES PATENT OFFICE.

FRANK GUNN FARNHAM, OF HONESDALE, PENNSYLVANIA.

ROTARY BRUSH.

SPECIFICATION forming part of Letters Patent No. 741,643, dated October 20, 1903.

Application filed November 6, 1901. Renewed February 19, 1903. Serial No. 144,156. (No model.)

*To all whom it may concern:*

Be it known that I, FRANK GUNN FARNHAM, a citizen of the United States, residing at Honesdale, Pennsylvania, have invented certain new and useful Improvements in Rotary Brushes, of which the following is a specification.

My invention relates to improvements in rotary brushes, and more particularly to that class of brushes known to the trade as "edge" and "breast" brushes used by shoe manufacturers to finish the upper edge of the sole where the stitching shows; but it may apply to metal-polishers' and jewelers' work.

The object of the invention is to provide a simple and effective brush mounted in a durable and economical manner.

The invention is illustrated in the accompanying drawings, in which—

Figure 1 is a central vertical section. Fig. 2 is a similar view of a modification, showing the edge brush mounted on the spindle of a large brush. Fig. 3 is a sectional detail.

The brush itself is generally a small disk brush, as shown at $h$, and may be of the ordinary construction and diameter, the invention residing in the manner of clamping it to its support and in the support itself.

Referring more particularly to the drawings, it will be seen that I employ, in connection with and as a support for the brush and spindle, the form of tube or sleeve patented to me under date of July 2, 1901, No. 677,502, though I do not limit myself to this particular form. This tube or sleeve is shown at $a'$ $a''$ and is designed to carry a main polishing-brush, (not shown,) such as described and shown in my aforesaid Letters Patent, the split collar by which it is clamped to an operating-spindle being indicated at $a$. The screw for clamping the brush in place is shown at $b''$. Within the end of the sleeve I insert a nut $d$, which is clamped by having the end of the sleeve split, as shown, and screwing the clamping-nut or collar $b''$ thereon. A spindle $f$ carries at its outer end a disk $g$, and on this spindle is slipped an opposing disk $j$, between which and the disk or head $g$ the brush $h$ (which has been slipped onto the spindle previous to the disk $j$) is held. The disks are forced toward each other to clamp the brush firmly by encircling the spindle $f$ with a tube $e$, which abuts against the cylindrical extension or collar of the disk $j$ at one end and against the nut $d$ at the other end when the threaded end of the spindle $f$ is screwed into the nut. Thus by inserting a suitable key in a key-socket $f'$ in the end of the spindle the brush $h$ may be securely clamped between the disks.

In Fig. 2 I have shown how the edge brush may be mounted on the sleeve without removing the main polishing-brush, and in this event I may, if desired, secure the nut $d'$ in the end of the sleeve by brazing or casting, avoiding the necessity of splitting the sleeve, and providing a clamping nut or collar.

In using the edge and breast brush I have found that the workman is likely at times to use the large or main brush as a lever to check the motion of the spindle when disconnected from its driving means. This has a tendency to unscrew or loosen the nut $b^2$, and to obviate this I place washers or disks $l\ m$ on opposite sides of the disk and secure a pin $c$ in a lug in the clamping-collar $a$, this pin projecting through an opening in the disk $m$ and into an opening in the brush.

I claim—

In combination, a rotary support having a threaded portion or nut, a spindle having a threaded end screwed in said portion or nut, and carrying a disk at its outer end, a movable disk on the spindle, a brush between said disks, and a sleeve encircling the spindle between the nut and movable disk, substantially as described.

In testimony whereof I affix my signature in presence of two witnesses.

FRANK GUNN FARNHAM.

Witnesses:
NORMAN C. FARNHAM,
ROBT. A. SMITH.